(12) United States Patent
Henry et al.

(10) Patent No.: US 9,425,912 B2
(45) Date of Patent: Aug. 23, 2016

(54) LANE-BASED MULTIPLEXING FOR PHYSICAL LINKS IN SERIAL ATTACHED SMALL COMPUTER SYSTEM INTERFACE ARCHITECTURES

(71) Applicant: LSI CORPORATION, San Jose, CA (US)

(72) Inventors: Charles D. Henry, Wichita, KS (US); Jeffrey D. Weide, Wichita, KS (US); Reid A. Kaufmann, Wichita, KS (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 572 days.

(21) Appl. No.: 13/894,742

(22) Filed: May 15, 2013

(65) Prior Publication Data

US 2014/0341231 A1 Nov. 20, 2014

(51) Int. Cl.
| | |
|---|---|
| *H04L 12/28* | (2006.01) |
| *G06F 15/16* | (2006.01) |
| *H04J 3/04* | (2006.01) |
| *G06F 13/42* | (2006.01) |
| *G06F 13/38* | (2006.01) |

(52) U.S. Cl.
CPC .............. *H04J 3/047* (2013.01); *G06F 15/16* (2013.01); *H04L 12/28* (2013.01); *G06F 13/385* (2013.01); *G06F 13/423* (2013.01)

(58) Field of Classification Search
CPC . G06F 13/385; G06F 13/387; G06F 13/4022; G06F 13/423; G06F 15/16; H04L 12/28
See application file for complete search history.

(56) References Cited

U.S. PATENT DOCUMENTS

| | | | |
|---|---|---|---|
| 5,838,681 A * | 11/1998 | Bonomi | H04L 49/25 370/395.41 |
| 7,269,674 B2 | 9/2007 | Chikusa et al. | |
| 7,373,541 B1 * | 5/2008 | Stenfort | G06F 13/423 713/400 |
| 8,219,719 B1 * | 7/2012 | Parry | G06F 3/0605 709/221 |
| 8,307,157 B2 | 11/2012 | Sakuma et al. | |
| 8,504,728 B1 * | 8/2013 | Williams | H04L 9/0637 709/250 |
| 2005/0223141 A1 * | 10/2005 | Seto | G06F 13/385 710/57 |
| 2007/0093124 A1 * | 4/2007 | Varney | G06F 11/3409 439/499 |
| 2010/0281172 A1 | 11/2010 | Parry et al. | |
| 2011/0022736 A1 * | 1/2011 | Uddenberg | G06F 13/4282 710/2 |
| 2011/0154171 A1 * | 6/2011 | Tran | G01R 31/31716 714/819 |
| 2012/0311256 A1 | 12/2012 | Nakajima et al. | |

\* cited by examiner

*Primary Examiner* — Henry Tsai
*Assistant Examiner* — Christopher A Daley

(57) ABSTRACT

Methods and structure for lane-based multiplexing of physical links are provided. In one embodiment, a Serial Attached Small Computer System Interface (SAS) device is provided. The SAS device comprises a physical link and a controller. The controller is able to time division multiplex the physical link into multiple lanes, and to manage a first connection along one or more of the lanes of the physical link. The controller is further able to detect a request for a second connection, to determine a link rate for the second connection, to select a number of additional lanes at the physical link based on the link rate for the second connection, and to manage the second connection along the additional lanes while the first connection is being managed.

20 Claims, 7 Drawing Sheets

LANE-BASED MULTIPLEXING FOR PHYSICAL LINKS IN SERIAL ATTACHED SMALL COMPUTER SYSTEM INTERFACE ARCHITECTURES

FIELD OF THE INVENTION

The invention relates generally to Small Computer System Interface (SCSI) systems, and more specifically to Serial Attached SCSI (SAS) systems that implement PHY multiplexing.

BACKGROUND

SAS standards as defined by the T10 committee presently allow for a single physical link (PHY) to multiplex two different connections. In such systems, the PHY is logically divided at start-of-day during discovery so that it acts as two entirely separate entities known as "logical PHYs." Each logical PHY supports a link rate that is half of the link rate of the actual PHY. During multiplexing, the actual PHY transmits a dword for one logical PHY, a dword for the other logical PHY, and so on in an alternating fashion.

SUMMARY

Systems and methods herein allow for flexible and dynamic PHY multiplexing in SAS environments. Specifically, a SAS device is capable of time division multiplexing and/or de-multiplexing a PHY into multiple lanes. The SAS device may then choose one or more sets of lanes to service each connection established through the PHY.

One exemplary embodiment is a Serial Attached Small Computer System Interface (SAS) device. The SAS device comprises a physical link and a controller. The controller is able to time division multiplex the physical link into multiple lanes, and to manage a first connection along one or more of the lanes of the physical link. The controller is further able to detect a request for a second connection, to determine a link rate for the second connection, to select a number of additional lanes at the physical link based on the link rate for the second connection, and to manage the second connection along the additional lanes while the first connection is being managed.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
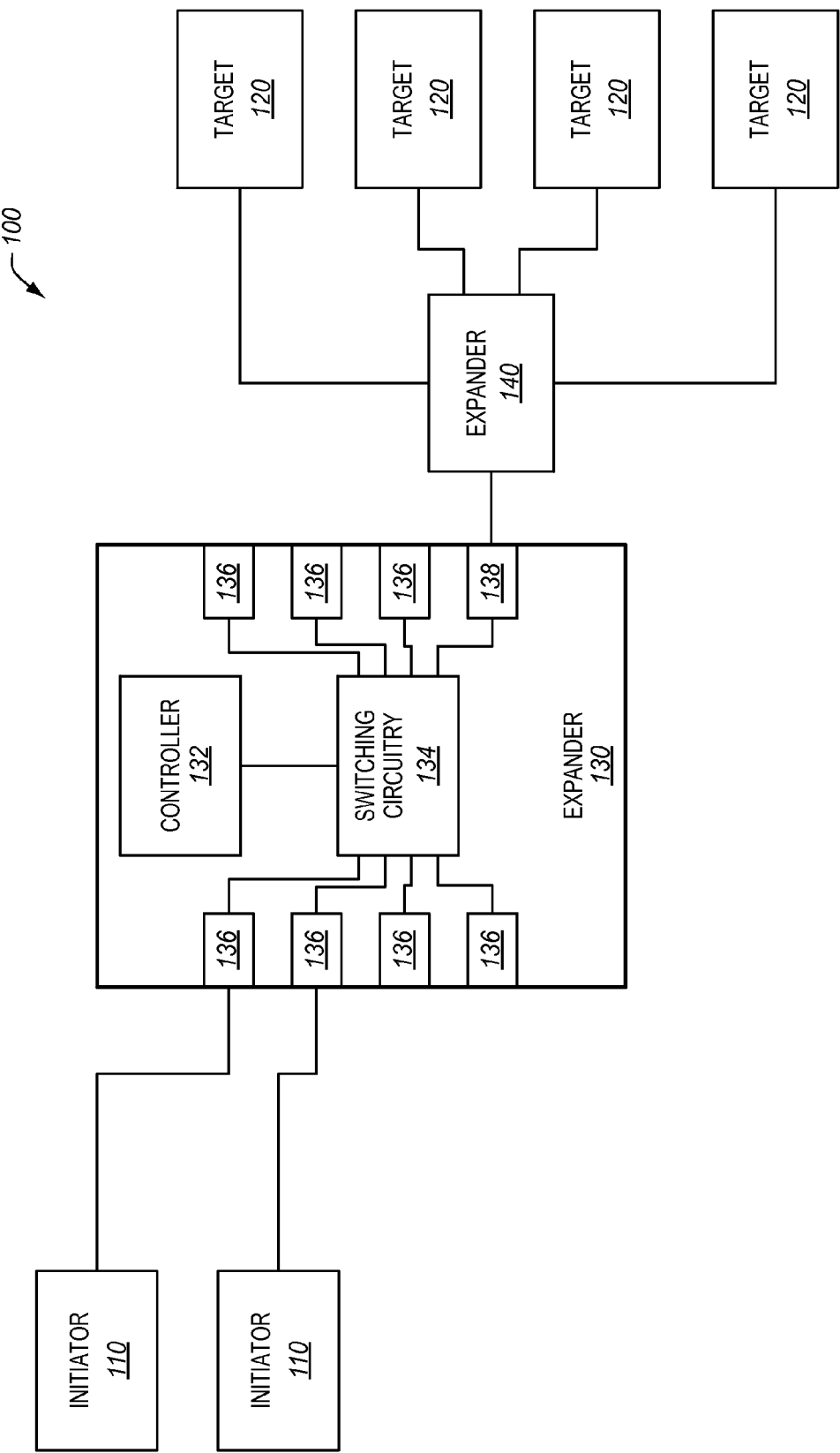
FIG. 1 is a block diagram of an exemplary SAS system.

FIG. 1 is a block diagram of an exemplary SAS system 100. SAS system 100 includes multiple SAS initiators 110 that can communicate with one or more SAS and/or Serial Advanced Technology Attachment (SATA) targets 120 via SAS expander 130 and SAS expander 140. For SAS system 100, point-to-point connections between physical links (PHYs) of the devices are opened and closed in order to establish connections that carry data between the various devices.

SAS system 100 supports multiplexing techniques that allow multiple connections to be carried over a single PHY at once. For example, if SAS expander 130 receives multiple connection requests (e.g., Open Address Frames (OAFs)) that are directed to the same outbound PHY 138, SAS expander 130 can multiplex each of these requested connections along the outbound PHY 138. A corresponding PHY at SAS expander 140 can receive multiplexed data for each of the connections, and SAS expander 140 can de-multiplex the data for each connection before sending the data outward towards one or more target devices 120. This dynamic multiplexing enhances the flexibility and performance of SAS system 100.

Within SAS system 100, initiators 110 comprise any suitable devices that are capable of functioning as initiators for any of Serial Management Protocol (SMP), Serial Advanced Technology Attachment Tunneling Protocol (STP), Serial SCSI Protocol (SSP), etc. In one embodiment, initiators 110 generate SAS commands based on Input/Output (I/O) requests from host systems. The combination of expanders and cabling that interconnect the various SAS initiators and SAS/SATA targets within SAS system 100 is referred to as a switched fabric.

In this embodiment, SAS expander 130 forms a part of the switched fabric of SAS system 100, and SAS expander 130 includes controller 132, which manages the operations of SAS expander 130 as it sets up and tears down connections between initiators 110 and targets 120. Specifically, controller 132 interprets incoming SAS connection requests (e.g., Open Address Frames) received at PHYs 136-138, and operates switching circuitry 134 (e.g., a crossbar switch) in order to establish connections to appropriate outbound PHYs within expander 130. Controller 132 has also been enhanced to dynamically multiplex connections, enabling single PHYs (e.g., PHY 138) to handle multiple connections at once. Controller 132 may be implemented as custom circuitry, a processor executing programmed instructions stored in program memory, or some combination thereof Expander 140 includes similar components to SAS expander 130, and in some embodiments may include the same components as SAS expander 130. Expander 140 includes a controller that is capable of receiving multiplexed data from a PHY of expander 130 and de-multiplexing the data for transmission to multiple SAS devices.

SAS/SATA targets 120, which receive communications from initiators 110 via expanders 130 and 140, may comprise storage devices that implement the persistent storage capacity of a storage system. For example, SAS/SATA targets 120 may comprise magnetic hard disks, solid state drives, optical media, etc.

The particular arrangement, number, and configuration of components described herein is exemplary and non-limiting. While in operation, the various elements of SAS system 100 open and close point-to-point connections with each other via the SAS expanders in order to exchange data. Further details of the operation of SAS system 100 are discussed with regard to the method of FIG. 2.

Figure 2:
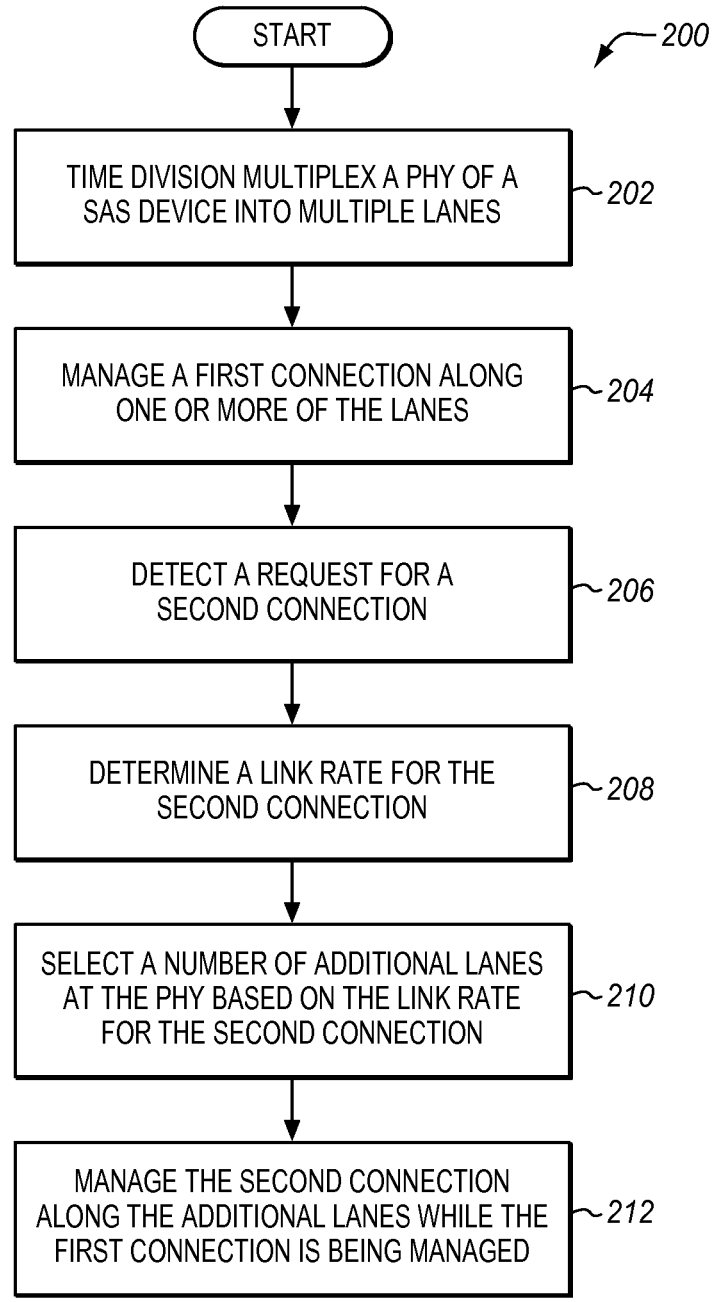
FIG. 2 is a flowchart describing an exemplary method of operating a SAS device to manage multiplexed connections.

FIG. 2 is a flowchart describing an exemplary method 200 of operating SAS device (in this case SAS expander 130) in order to manage multiplexed connections. According to FIG. 2, in step 202 controller 132 time division multiplexes a PHY into multiple lanes. Specifically, controller 132 identifies a PHY that is operating at a defined link rate, and time division multiplexes the PHY into multiple time slots referred to as "lanes," each lane having a throughput that is slower than the overall link rate of the PHY itself. For example, a PHY with a link rate of 12 Gigabits per second (Gbps) may be divided into eight lanes that each support 1.5 Gbps of throughput, four lanes that each support 3 Gbps throughput, etc.

In step 204, controller 132 manages a first connection along one or more of the lanes. For example, the first connection may comprise a 3.0 Gbps connection serviced by two lanes for the multiplexed PHY. In step 206, controller 132 detects a request for a second connection to be managed through the multiplexed PHY. For example, in one embodiment controller 132 reviews an OAF received at expander 130, and determines based on a destination address within the OAF that a second connection should be opened along the multiplexed PHY.

In step 208, controller 132 determines a link rate for the second connection. The link rate can for example be specifically indicated by a portion of the OAF (e.g., as a connection rate defined in Byte 1, Bits 0-3 of the OAF). In step 210, controller 132 selects a number of additional lanes at the PHY based on the link rate for the second connection. For example, if each lane is 1.5 Gbps and the link rate for the second connection is 6 Gbps, four currently idle lanes at the multiplexed PHY may be assigned to carry data for the second connection.

In step 212, controller 132 manages the second connection along the additional lanes while the first connection is also being managed (i.e., while the first connection is still open). This comprises sending data along the additional lanes used for the second connection, while also sending data along the lanes used for the first connection.

Method 200 allows for flexible and dynamic multiplexing in a SAS environment. Any number of connections may be serviced by the multiplexed PHY (up to the total number of available lanes), and each connection may be supported at any acceptable SAS link rate. The connections may even vary in link rate with respect to each other.

Even though the steps of the methods herein are described with reference to SAS system 100 of FIG. 1, these methods may be performed in other SAS systems. The steps of the flowcharts described herein are not all inclusive and may include other steps not shown. The steps described herein may also be performed in an alternative order.

Figure 3:
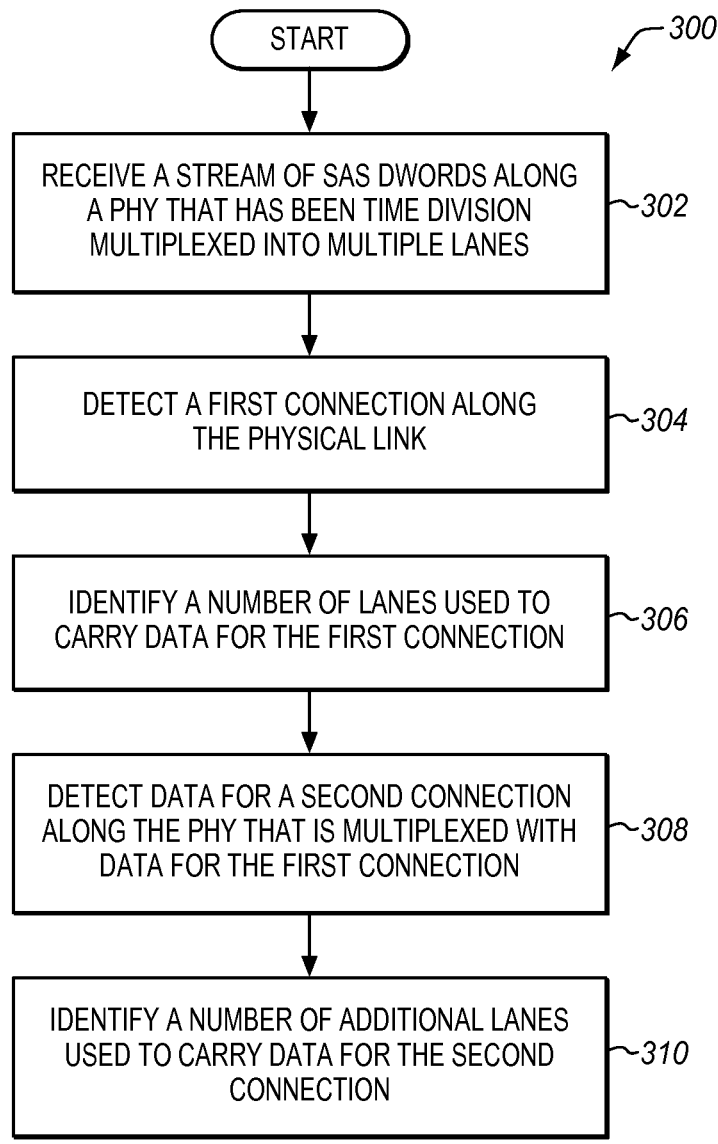
FIG. 3 is a flowchart describing a further exemplary method of operating a SAS device.

FIG. 3 is a flowchart describing a further exemplary method 300 of operating a SAS device. FIG. 3 illustrates de-multiplexing performed at a SAS device, such as when SAS expander 130 receives a multiplexed stream of data at PHY 138 from SAS expander 140.

According to FIG. 3, in step 302, SAS expander 130 receives a stream of SAS dwords along PHY 138. The stream of dwords has been multiplexed into multiple lanes of traffic. For example, the stream of data can be sent iteratively in cycles to PHY 138, where for each cycle, one SAS dword for each lane is transmitted. Based on the initial handshake between PHY 138 and a PHY of SAS expander 140, controller 132 of SAS expander 130 determines the link rate for PHY 138, the number of lanes used for multiplexing at PHY 138, and the throughput for each lane. Therefore, when data for a new connection is received along PHY 138, controller 132 of SAS expander 130 is aware that PHY 138 is receiving multiplexed data, and is able to determine the number of lanes used to multiplex the data.

In one embodiment, during an initial handshake between PHY 138 and a PHY of expander 140, the devices exchange capability information to determine that both of the PHYs support lane-based time domain multiplexing, and in order to determine the number (and throughput) of each lane. DWORD synchronization techniques are then used in order to ensure that each lane (and cycle) is appropriately synchronized between the PHYs.

In step 304, controller 132 detects a first connection along PHY 138. For example, the first connection can be determined when, for a given cycle, a Start Of Address Frame (SOAF) primitive is received along a lane. In a further example, a connection may be detected when lanes that were idle in the previous cycle are now used to transmit data. Each of the previously idle lanes is then associated with the first connection.

In step 306, controller 132 identifies a number of lanes used to carry data for the first connection. The number (and identity) of lanes used for the first connection can be determined based on the number (and identity) of lanes in this cycle that were previously idle but now are being used to transmit data (e.g., any dwords that are not ALIGN primitives). Controller 132 then continues to receive cycles of data at PHY 138 until a second connection is detected in step 308.

In step 308, controller 132 detects data for a second connection along the PHY. The data for the second connection is multiplexed with the data for the first connection. The second connection can be detected in a similar manner to the first. The second connection can be detected, for example, when a SOAF primitive has been received along a previously idle lane. The number of lanes used to carry data for the second connection can be determined in step 310 based on the number of lanes in the current cycle that were previously idle but now are being used to transmit data (e.g., "data" in this case being any dwords that are not ALIGN primitives).

Examples

In the following examples, additional processes, systems, and methods are described in the context of a SAS expander that multiplexes SAS connections along a PHY.

Figure 4:
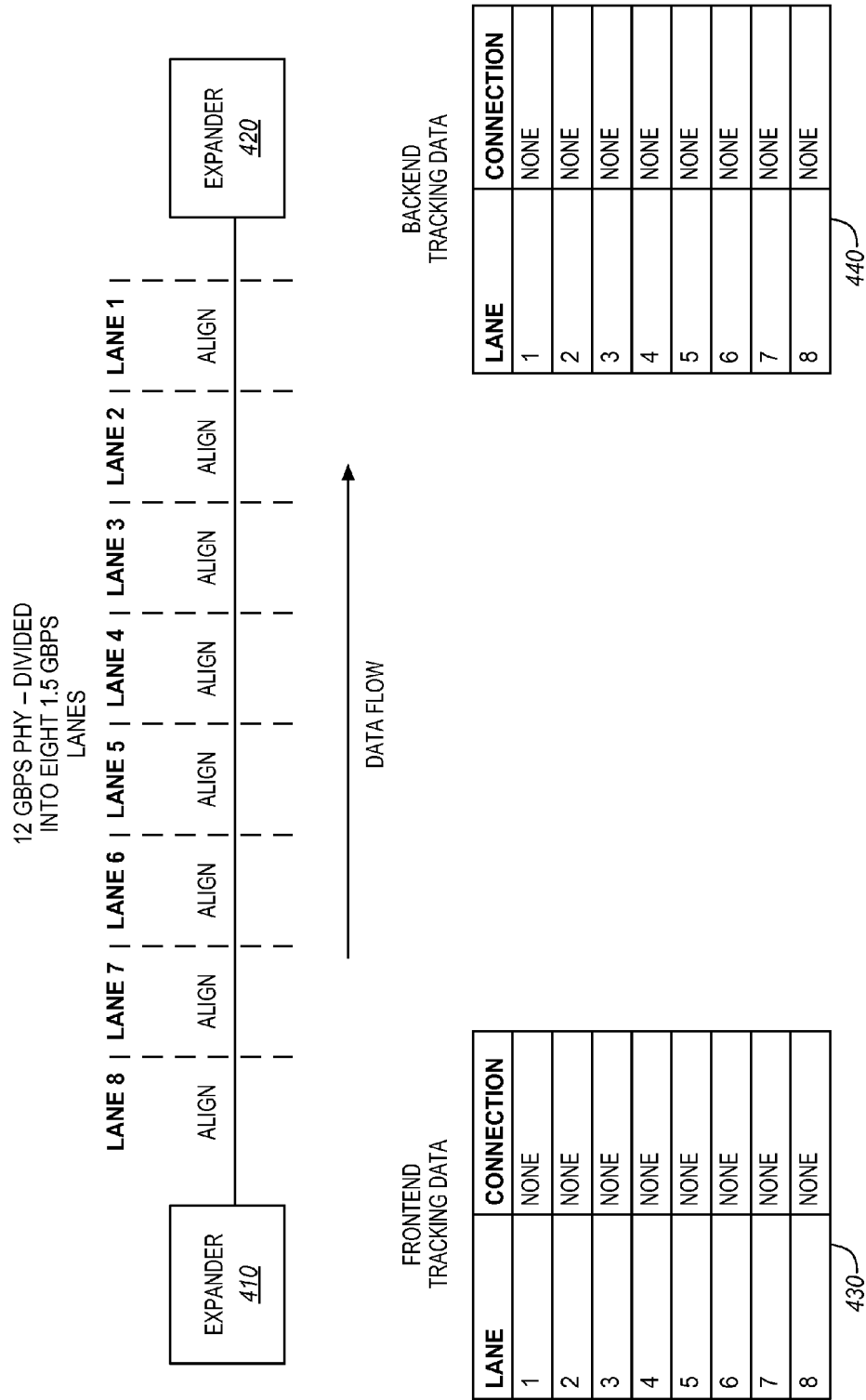
FIGS. 4-6 are block diagrams illustrating exemplary communications between two SAS expanders.
Figure 5:
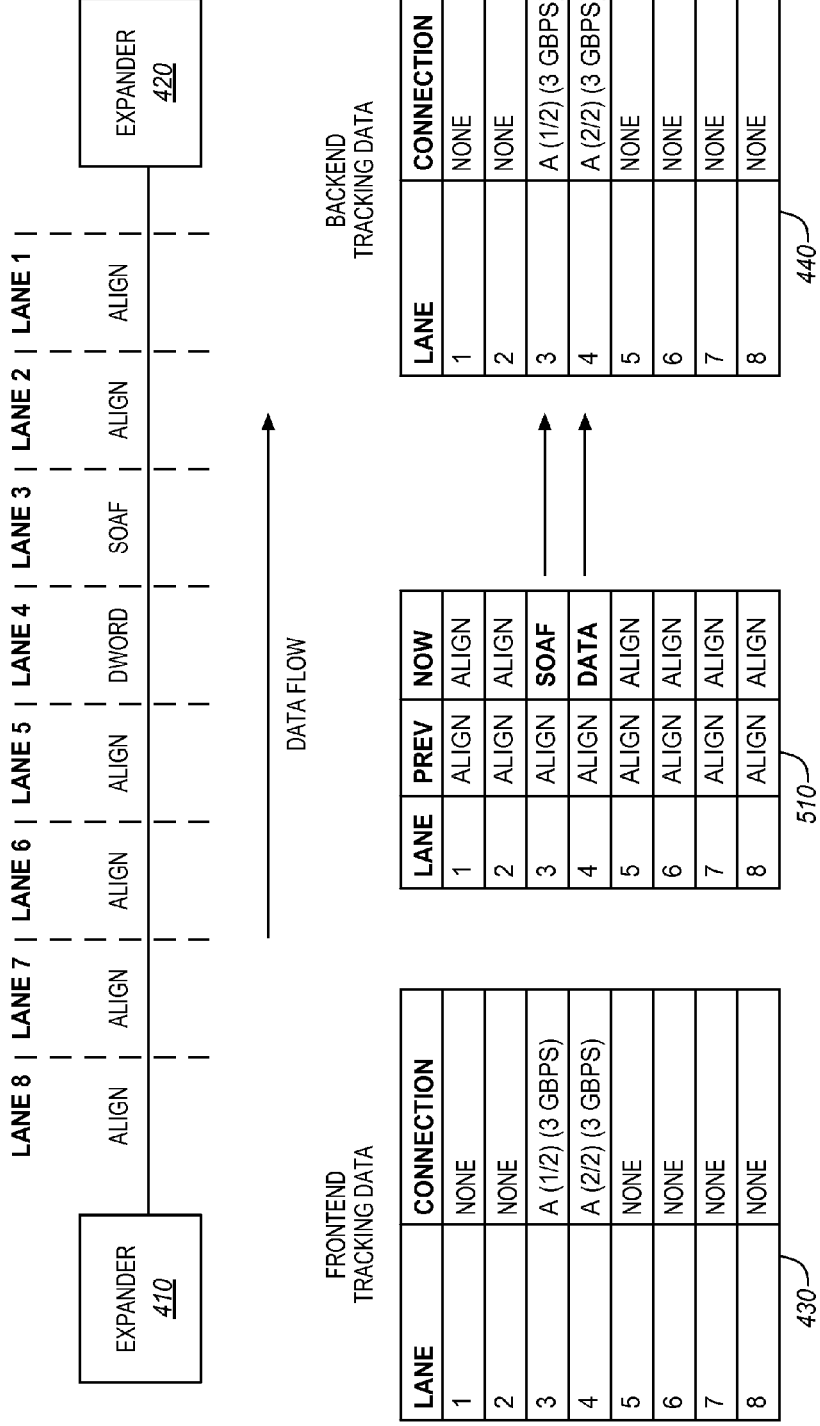
Figure 6:
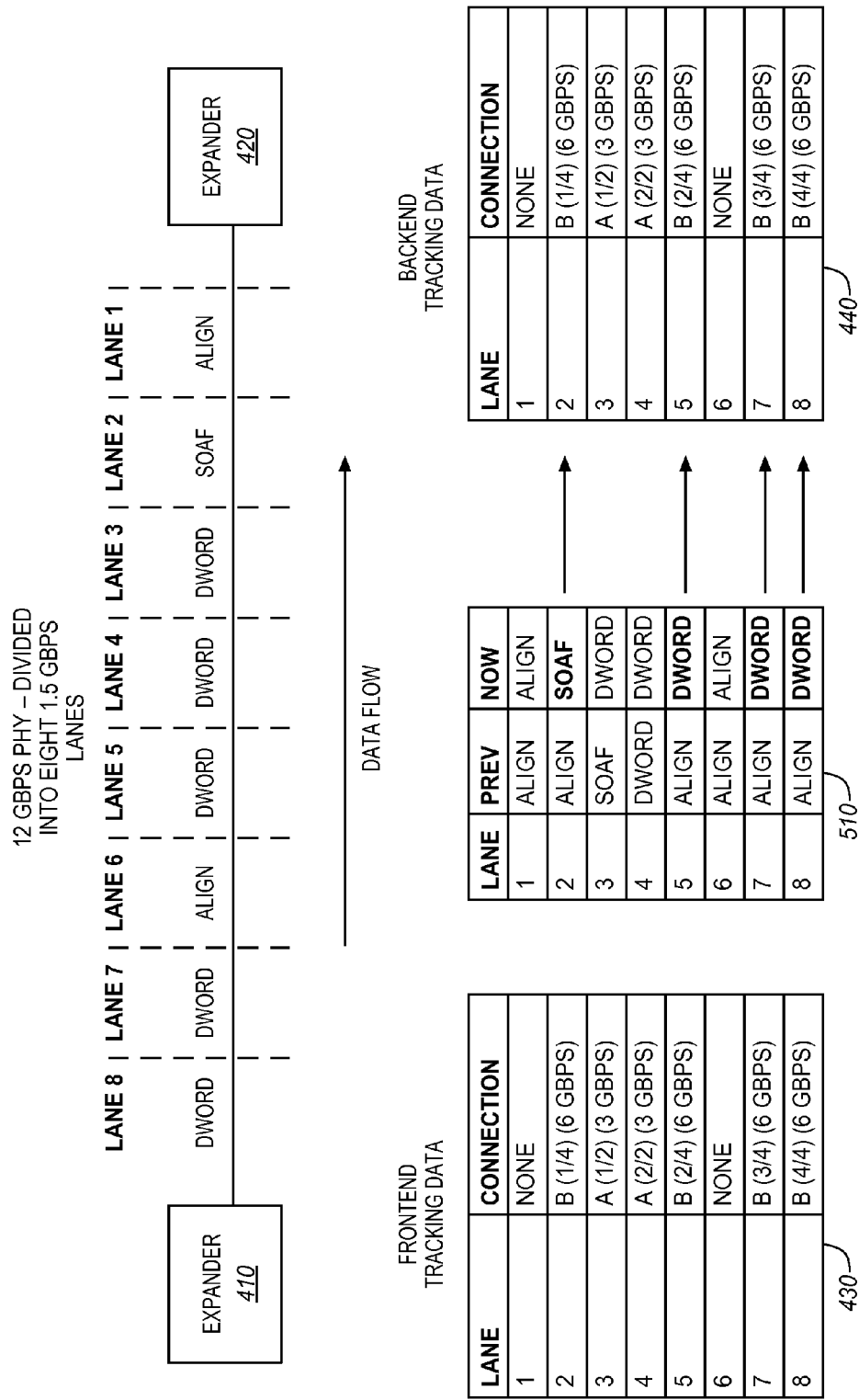

FIGS. 4-6 are block diagrams illustrating exemplary communications between two SAS expanders. In FIG. 4, SAS expander 410 transmits time division multiplexed data to SAS expander 420. The data is multiplexed into multiple time slots that are each referred to as lanes. In this example, the PHY itself supports a 12 Gbps link rate, and each of the eight lanes supports a 1.5 Gpbs throughput.

The act of transmitting one dword for each of the eight lanes is referred to as a "cycle." In this example, a single cycle of data is shown as it is transmitted from expander 410 to expander 420. In the cycle, the dword for each lane is the same: an ALIGN primitive. The ALIGN primitive is used to indicate that a lane is currently idle, but may in the future be used to carry data. Frontend tracking data 430, maintained by a controller of expander 410, indicates that there are no active connections. Similarly, backend tracking data 440, maintained by a controller of SAS expander 420, also indicates that there are no active connections.

At some point in time, expander 410 receives an OAF that is directed to a SAS address available through the multiplexed PHY. Therefore, a controller of expander 410 allocates one or more lanes at the multiplexed PHY to carry data for the connection. In this case, the connection is a 3 Gbps connection, and lanes 3 and 4 are assigned by the controller of expander 410 to carry the data for the connection. Since this is a new connection, the first dword sent along the connection is a SOAF primitive along lane 3. Lane 4 carries a dword that immediately follows the SOAF.

Expander 420 is initially unaware of what lanes are used for the new connection, or for that matter that any new connection has been established. However, a controller at expander 420 is capable of determining that a new connection has been established after expander 420 compares the previous cycle of dwords to the current cycle of dwords (as shown at 510). The controller first detects a SOAF primitive along a lane that was previously idle and transmitting an ALIGN primitive. This is a trigger indicating that a new connection has been created during this cycle. The controller then determines which other lanes are used to carry data for the new connection. In this case, the only other lane that sent an ALIGN primitive in the last cycle and is carrying a data dword in the current cycle is lane 4. Therefore, lane 4 is associated with lane 3 as servicing the same connection. Since each lane is a 1.5 Gbps lane, the controller at expander 420 determines that the overall link rate for the new two-lane connection is 3 Gbps. The connection rate can also be confirmed by reviewing the first data DWORD for the connection that is transmitted after the SOAF primitive. The data DWORD will include the first 4 bytes of the OAF, which will include the link rate for the connection.

FIG. 6 illustrates a new connection that is serviced by the multiplexed PHY. The new connection does not utilize sequential lanes to carry the data for the new connection. In this example, the controller of expander 410 detects a new OAF, and analyzes a field of the OAF to determine that the new connection should be operated at a 6 Gbps rate. Therefore, the controller assigns four 1.5 Gbps lanes to service the new connection (lanes 2, 5, 7, and 8). The frontend tracking data is then updated to reflect this new connection and dwords for the connection are sent out along the newly assigned lanes.

At expander 420, as the cycle of dwords is received, it is compared to the previous cycle of dwords. In this case, four lanes that used to carry ALIGN primitives are now used to carry data. Furthermore, since there is only one SOAF in this cycle, all of the previously idle lanes are used for the same connection. Therefore, a controller at expander 420 determines that a new four lane, 6 Gbps connection has been created, and it updates backend tracking data to reflect this new connection. Additional connections can also be added by expander 410 in future cycles.

When a connection is closed, expander 410 resumes sending ALIGN primitives along the lanes that were previously used to service the connection. Expander 420, upon detecting the ALIGN primitives along the lanes that were assigned to the previously active connection, determines that the connection has been closed, and can update backend tracking data 440 appropriately.

In further embodiments where multiple SOAF primitives are received during one cycle (indicating that multiple connections have been established within the cycle), it can be more complicated to determine which lanes are associated with each new connection. For example, a SOAF primitive may be received on both lane 3 and also on lane 7, indicating that two new connections have been formed. In such cases, the controller at expander 420 may decide that lanes that sequentially follow the lane of the first SOAF primitive are used to carry data for the first connection, the lanes that sequentially follow the lane of the second SOAF primitive are used to carry data for the second connection, etc.

While the above process has been discussed when regard data sent from expander 410 to expander 420, in one embodiment expander 410 uses a similar multiplexing scheme to transmit data to expander 410.

Figure 7:
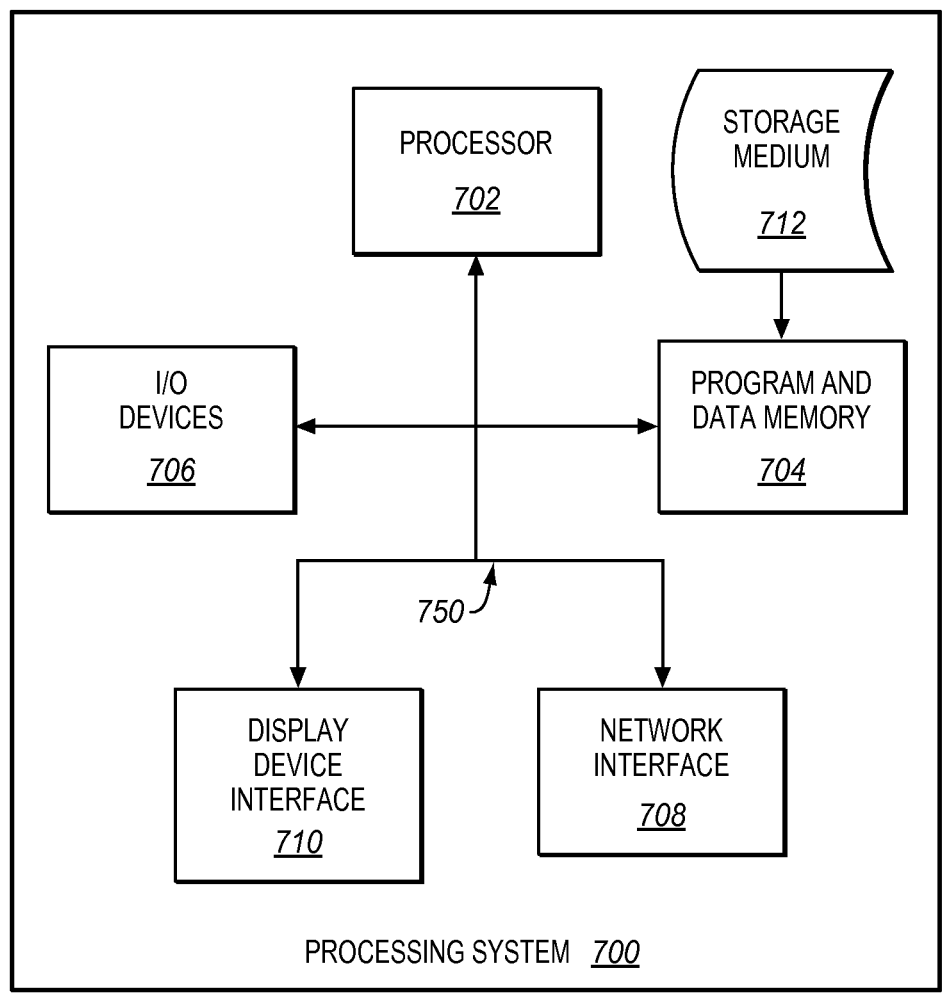
FIG. 7 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of SAS expander 130 and/or 140 to perform the various operations disclosed herein. FIG. 7 illustrates an exemplary processing system 700 operable to execute a computer readable medium embodying programmed instructions. Processing system 700 is operable to perform the above operations by executing programmed instructions tangibly embodied on computer readable storage medium 712. In this regard, embodiments of the invention can take the form of a computer program accessible via computer readable medium 712 providing program code for use by a computer (e.g., processing system 700) or any other instruction execution system. For the purposes of this description, computer readable storage medium 712 can be anything that can contain or store the program for use by the computer (e.g., processing system 700).

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

What is claimed is:

1. A system comprising:
a Serial Attached Small Computer System Interface (SAS) device comprising:
a physical link; and
a controller operable to time division multiplex the physical link into multiple lanes, and to manage a first SAS connection along one or more of the lanes of the physical link,
the controller is further operable to detect a request for a SAS second connection, to determine a link rate for the second SAS connection, to select a number of additional lanes at the physical link based on the link rate for the second SAS connection, and to manage the second SAS connection along the additional lanes while the first SAS connection is being managed.

2. The system of claim 1, wherein:
the controller is further operable to manage the second SAS connection at a link rate that is different than the first SAS connection.

3. The system of claim 1, wherein:
the controller is further operable to select one or more other lanes of the physical link, and to manage a third SAS connection along the other lanes while the first SAS connection and the second SAS connection are being managed.

4. The system of claim 1, wherein:
The controller is further operable to time division multiplex the physical link by cyclically transmitting one dword per lane along the physical link.

5. The system of claim 1, wherein:
the controller is further operable time division multiplex the physical link into lanes that each support a link rate of 1.5 Gigabits per second.

6. The system of claim 1, wherein:
the controller is further operable to manage the second SAS connection along multiple additional lanes that are not sequential in time with respect to each other.

7. The system of claim 1, wherein:
the controller is further operable to insert ALIGN primitives into each lane that is not currently servicing a SAS connection.

8. A method comprising:
time division multiplexing a physical link of a Serial Attached Small Computer System Interface (SAS) device into multiple lanes;
manage a first SAS connection along one or more of the lanes of the physical link;
detecting a request for a second SAS connection;
determining a link rate for the second SAS connection;
selecting a number of additional lanes at the physical link based on the link rate for the second SAS connection; and
managing the second SAS connection along the additional lanes while the first connection is being managed.

9. The method of claim 8, further comprising:
managing the second SAS connection at a link rate that is different than the first SAS connection.

10. The method of claim 8, further comprising:
selecting one or more other lanes of the physical link; and
managing a third SAS connection along the other lanes while the first SAS connection and the second SAS connection are being managed.

11. The method of claim 8, further comprising:
time division multiplexing the physical link by cyclically transmitting one dword per lane along the physical link.

12. The method of claim 8, further comprising:
time division multiplexing the physical link into lanes that each support a link rate of 1.5 Gigabits per second.

13. The method of claim 8, further comprising:
managing the second SAS connection along multiple additional lanes that are not sequential in time with respect to each other.

14. The method of claim 8, further comprising:
inserting ALIGN primitives into each lane that is not currently servicing a SAS connection.

15. A system comprising:
a Serial Attached Small Computer System Interface (SAS) device comprising:
a physical link that has been time division multiplexed into multiple lanes; and
a controller operable to receive a stream of Serial Attached Small Computer System Interface dwords along the physical link, to detect a first SAS connection along the physical link, and to identify a number of lanes used to carry data for the first SAS connection,
the controller further operable to detect data for a second SAS connection along the physical link that is multiplexed with data for the first connection, and to identify a number of additional lanes used to carry data for the second SAS connection.

16. The system of claim 15, wherein:
the controller is further operable to detect transmission cycles wherein for each cycle one dword is transmitted per lane, and
the controller is further operable to detect new SAS connections by analyzing differences between dwords in the present cycle and dwords in the previous cycle.

17. The system of claim 16, wherein:
the controller is further operable to detect a new SAS connection by detecting a Start Of Address Frame primitive along a lane that transmitted an ALIGN primitive in the previous cycle.

18. The system of claim 17, wherein:
the controller is further operable to identify a number of lanes for the new SAS connection based on the number of lanes that transmitted ALIGN primitives in the previous cycle and that also are presently transmitting dwords that are not ALIGN primitives.

19. The system of claim 15, wherein:
the controller is further operable to maintain tracking data indicating which lanes are currently associated with each SAS connection.

20. The system of claim 19, wherein:
the controller is further operable to remove a SAS connection from the tracking data when the lanes for that SAS connection are currently transmitting ALIGN primitives.

* * * * *